(12) United States Patent
Chen et al.

(10) Patent No.: US 10,198,145 B2
(45) Date of Patent: *Feb. 5, 2019

(54) INTERCHANGEABLE DISPLAY OF INFORMATION PANELS ON A DASHBOARD

(71) Applicant: THUNDER POWER NEW ENERGY VEHICLE DEVELOPMENT COMPANY LIMITED, Central (HK)

(72) Inventors: Yong-Syuan Chen, New Taipei (TW); Jen-Chieh Hsiao, Taipei (TW)

(73) Assignee: THUNDER POWER NEW ENERGY VEHICLE DEVELOPMENT COMANY LIMITED, Central (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/359,173

(22) Filed: Nov. 22, 2016

(65) Prior Publication Data

US 2017/0075512 A1 Mar. 16, 2017

Related U.S. Application Data

(63) Continuation of application No. 14/967,378, filed on Dec. 14, 2015, now Pat. No. 9,561,724, which is a
(Continued)

(51) Int. Cl.
*G09G 5/00* (2006.01)
*G06F 3/0481* (2013.01)
(Continued)

(52) U.S. Cl.
CPC ............ *G06F 3/0481* (2013.01); *B60K 35/00* (2013.01); *G06F 3/14* (2013.01); *G06F 3/147* (2013.01);
(Continued)

(58) Field of Classification Search
CPC ...... G06F 3/041; G06F 3/1423; G06F 3/1454; G06F 3/147; G09G 2380/10; B60K 35/00; B60K 37/02; B60K 37/04; B60K 37/06

See application file for complete search history.

(56) References Cited

U.S. PATENT DOCUMENTS 7,966,577 B2   6/2011   Chaudhri et al.
8,477,108 B2   7/2013   Waller et al.
(Continued)

FOREIGN PATENT DOCUMENTS

CN   103660947 A   3/2014
CN   206049362 U   3/2017
(Continued)

OTHER PUBLICATIONS

U.S. Appl. No. 14/854,050, filed Sep. 15, 2015, Non Final Rejection dated Jun. 15, 2016, all pages.
(Continued)

*Primary Examiner* — Joe H Cheng
(74) *Attorney, Agent, or Firm* — Kilpatrick Townsend & Stockton LLP

(57) ABSTRACT

Interchangeable display of information panels on a Dashboard screen of a dashboard in a transportation apparatus is disclosed. The information panels may be graphically displayed at respective positions on the Dashboard screen such that they are separate and independent from each other. In some examples, the display position of a given information panel may be swapped with the display position of another given information panel on the Dashboard screen. In some examples, the display the given information panel may be duplicated at another display position on the Dashboard
(Continued)

screen. In some examples, the display the given information panel may be moved to a new display position on the Dashboard screen.

16 Claims, 9 Drawing Sheets

Related U.S. Application Data continuation of application No. 14/854,050, filed on Sep. 15, 2015, now Pat. No. 9,563,329.

(51) Int. Cl.
| | |
|---|---|
| G06F 3/14 | (2006.01) |
| B60K 35/00 | (2006.01) |
| G06F 3/147 | (2006.01) |
| G06T 3/20 | (2006.01) |
| G02F 1/1333 | (2006.01) |

(52) U.S. Cl.
CPC .......... *G06F 3/1423* (2013.01); *G06F 3/1446* (2013.01); *G06F 3/1454* (2013.01); *G06T 3/20* (2013.01); *B60K 2350/352* (2013.01); *B60K 2350/92* (2013.01); *G02F 1/13336* (2013.01); *G09G 2340/0464* (2013.01); *G09G 2354/00* (2013.01); *G09G 2380/10* (2013.01)

(56) References Cited

U.S. PATENT DOCUMENTS

| | | | |
|---|---|---|---|
| 9,046,685 | B2 | 6/2015 | Nakada |
| 9,452,678 | B1 | 9/2016 | Boss et al. |
| 9,561,724 | B1 | 2/2017 | Chen et al. |
| 9,563,329 | B1 | 2/2017 | Chen et al. |
| 2001/0029410 | A1 | 10/2001 | Obradovich |
| 2003/0023353 | A1 | 1/2003 | Badarneh |
| 2003/0064757 | A1 | 4/2003 | Yamadera et al. |
| 2003/0164818 | A1 | 9/2003 | Miller-Smith |
| 2004/0117084 | A1 | 6/2004 | Mercier et al. |
| 2007/0126698 | A1 | 6/2007 | Iwamoto et al. |
| 2007/0157126 | A1 | 7/2007 | Tschirhart et al. |
| 2007/0222769 | A1* | 9/2007 | Otsuka ................. G01C 21/265 345/173 |
| 2008/0129684 | A1* | 6/2008 | Adams ................... B60K 35/00 345/156 |
| 2008/0161997 | A1 | 7/2008 | Wengelnik et al. |
| 2008/0211652 | A1 | 9/2008 | Cope et al. |
| 2008/0278821 | A1* | 11/2008 | Rieger ................. G02B 27/017 359/630 |
| 2010/0268426 | A1* | 10/2010 | Pathak ................. G06F 3/03547 701/48 |
| 2011/0107272 | A1 | 5/2011 | Aguilar |
| 2011/0164063 | A1* | 7/2011 | Shimotani ............. G06F 3/0416 345/661 |
| 2011/0209079 | A1 | 8/2011 | Tarte et al. |
| 2012/0309465 | A1 | 12/2012 | Tani |
| 2013/0144520 | A1 | 6/2013 | Ricci |
| 2013/0144710 | A1 | 6/2013 | Roundtree et al. |
| 2013/0207794 | A1 | 8/2013 | Patel et al. |
| 2013/0293452 | A1* | 11/2013 | Ricci ..................... G02B 27/01 345/156 |
| 2014/0077942 | A1 | 3/2014 | Jayamohan et al. |
| 2014/0191940 | A1 | 7/2014 | Edgren |
| 2014/0245451 | A1 | 8/2014 | Le Sant et al. |
| 2014/0293349 | A1 | 10/2014 | Murai |
| 2016/0092072 | A1 | 3/2016 | So et al. |
| 2016/0239261 | A1 | 8/2016 | Wild et al. |
| 2017/0075511 | A1 | 3/2017 | Chen et al. |

FOREIGN PATENT DOCUMENTS

| | | |
|---|---|---|
| JP | 2010234876 A | 10/2010 |
| WO | 2006/006689 A1 | 1/2006 |

OTHER PUBLICATIONS

U.S. Appl. No. 14/854,050, filed Sep. 15, 2015, Notice of Allowance dated Sep. 23, 2016, all pages.
U.S. Appl. No. 14/967,378, filed Dec. 14, 2015, Non Final Rejection dated Jun. 9, 2016, all pages.
U.S. Appl. No. 14/967,378, filed Dec. 14, 2015, Notice of Allowance dated Sep. 23, 2016, all pages.
European Office Action dated Jun. 22, 2018 in the corresponding European application (application No. 16186089.5).
U.S. Non Final Office Action dated Mar. 22, 2018 in the corresponding application (U.S. Appl. No. 15/895,658).

* cited by examiner

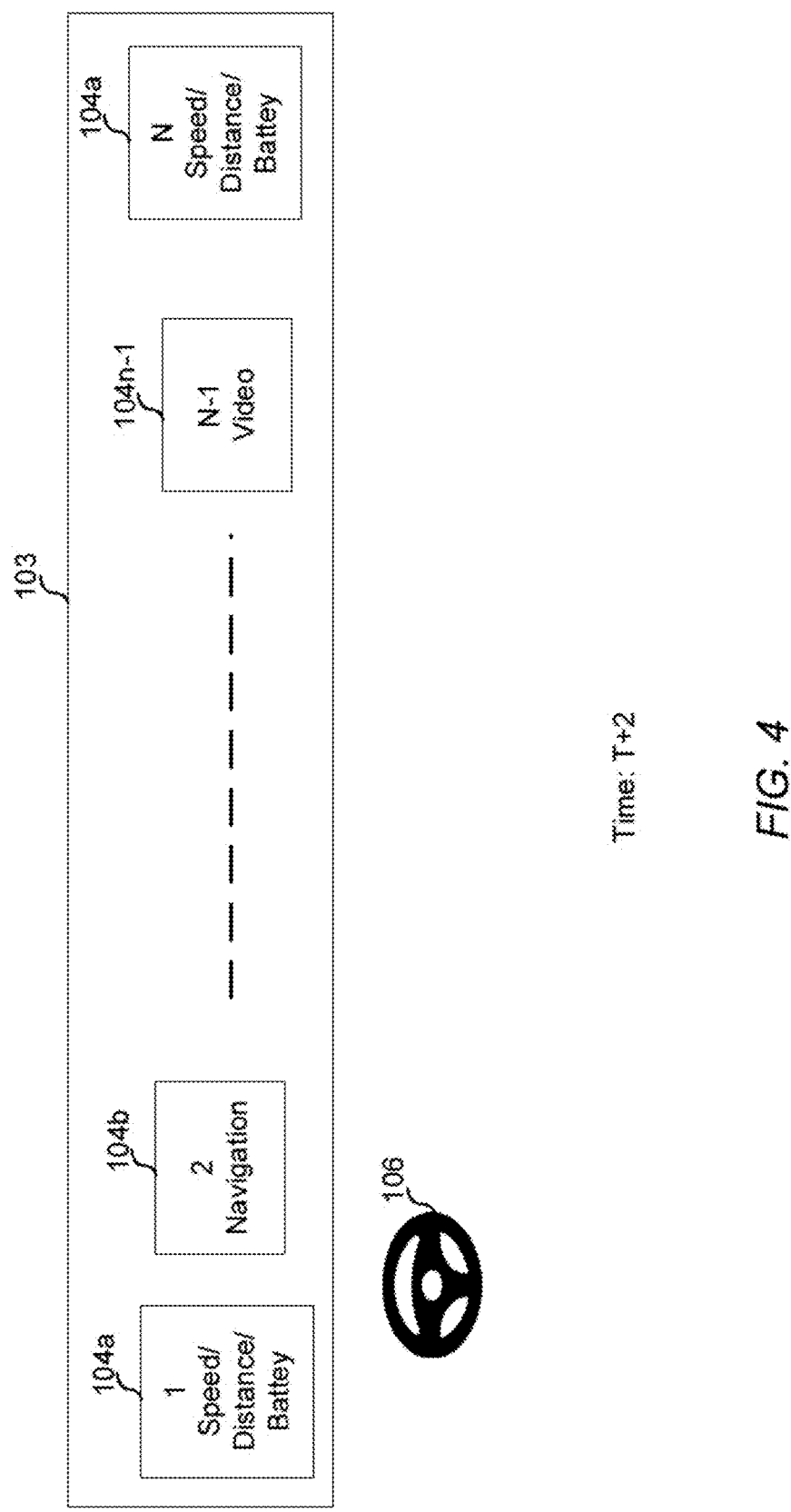

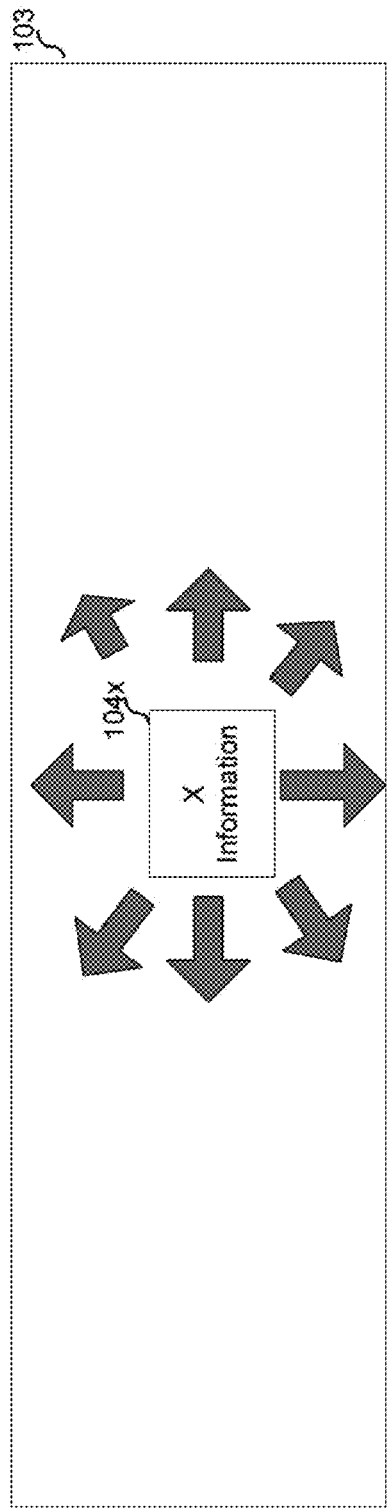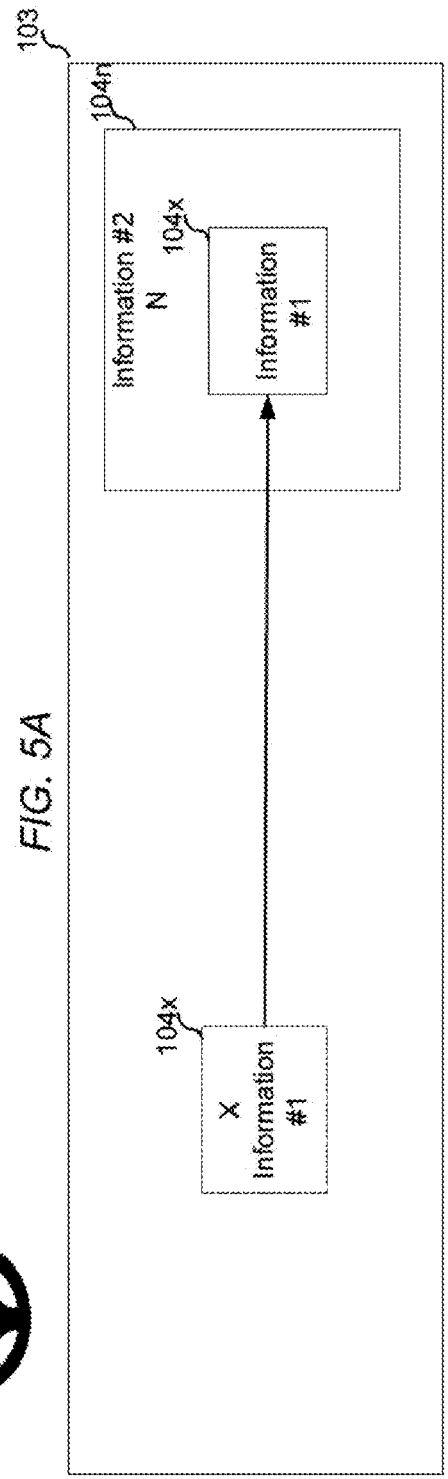
FIG. 5A
FIG. 5B

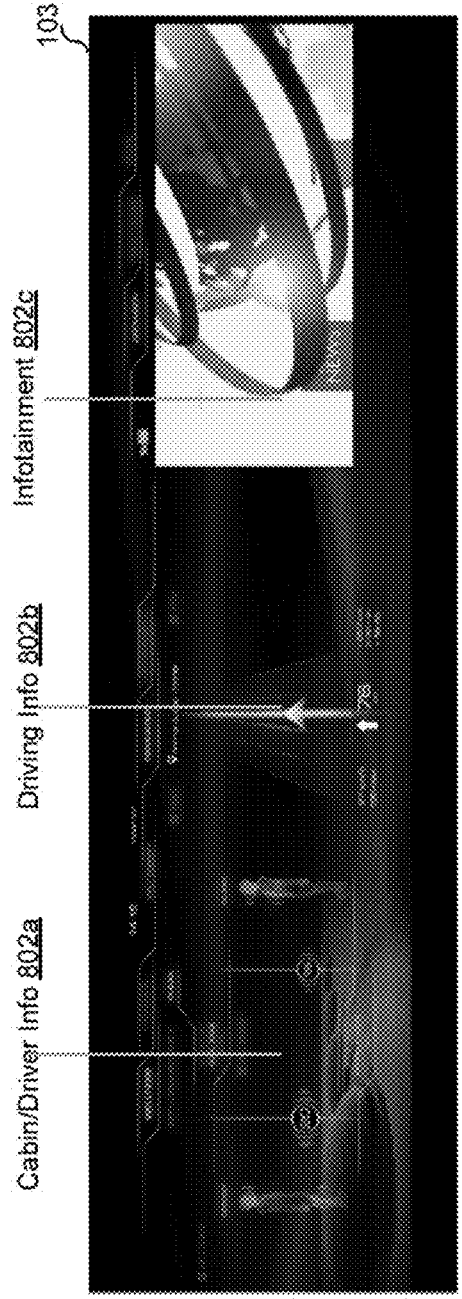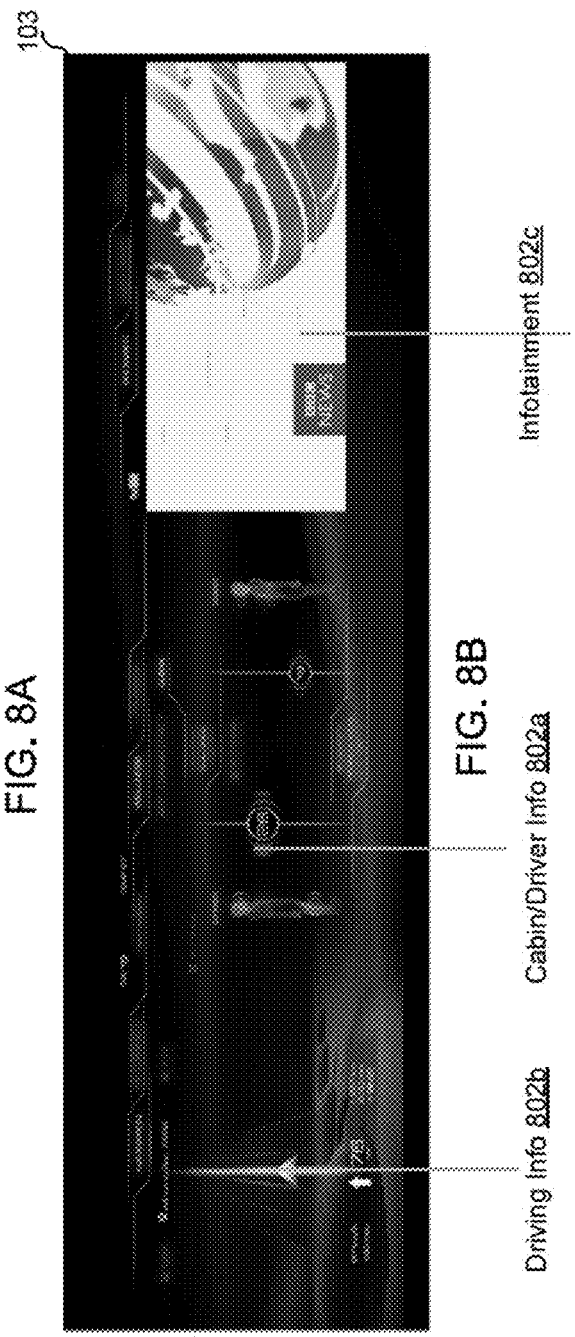
FIG. 8A
FIG. 8B

INTERCHANGEABLE DISPLAY OF INFORMATION PANELS ON A DASHBOARD

CROSS-REFERENCE TO RELATED APPLICATIONS

The present application is a continuation of U.S. Nonprovisional patent application Ser. No. 14/967,378, filed Dec. 14, 2015, now U.S. Pat. No. 9,563,329 B1, which is a continuation of U.S. Nonprovisional patent application Ser. No. 14/854,050, filed Sep. 15, 2015, now U.S. Pat. No. 9,561,724 B1, the disclosures of each of which are hereby incorporated by reference in their entireties for all purposes.

FIELD OF THE INVENTION

The invention generally relates to user interface displayed on a dashboard in a transportation apparatus.

BACKGROUND OF THE INVENTION

Traditional instrument panels in a transportation apparatus, such as a vehicle, a vessel, or an aircraft, are typically fixed to corresponding positions on a dashboard. For example, speedometer, odometer, fuel gauge, and other gauges are typically fixed to corresponding positions on driver's side dashboard; and radio, GPS, music, and climate control (e.g. A/C) are typically fixed to the middle of the dashboard. The traditional instrument panels are typically separate and independent from each other. For example, the speedometer, a gauge that measures and displays the instantaneous speed of the transportation apparatus, is separate and independent from the odometer, a gauge indicating a distance traveled by the transportation apparatus.

Developments in liquid crystal display (LCD) technology have made free-form display on a dashboard a reality. Equipped with the new free-form display technology, a Dashboard screen can be snipped and shaped to fit virtually any layout design on a dashboard and to fill the entire surface area of the dashboard. The free-form display's flexibility makes it possible to integrate every necessary monitor or gauge, from speedometer to odometer, into a single instrument panel.

SUMMARY OF THE INVENTION

In accordance with one aspect of the invention, a mechanism for interchangeable display of information panels on a dashboard screen, which fits on a portion of or entire dashboard of a transportation apparatus, is disclosed. Information panels, such as speedometer, odometer, fuel gauge, various indicators (e.g., airbag, seat belt, maintenance indicators, etc.), radio, music, climate control, GPS, video, browser and any other information panels suitable to be presented on the dashboard of a transportation apparatus, may be displayed on the dashboard screen digitally and graphically. The individual information panels may be displayed on the dashboard screen at corresponding positions at a first given time and may be displayed on the dashboard screen at different positions at a second given time. A user of the transportation apparatus, e.g., a driver or passenger, may be enabled to instruct any given information panel to be displayed at a desired position on the dashboard screen at any given time.

In some examples, the user may be enabled to instruct two or more information panels to switch their display positions on the dashboard screen. In some examples, the user may instruct a given information panel to be clustered on top of another information panel. Compared with the traditional fixed display of information panels discussed above, the display modes of the information panels on the dashboard screen in accordance with the present disclosure may enable the user(s) of the transportation apparatus (e.g., the driver(s) or the passenger(s)) to swap or move information panels as desired. This may advantageously let the user(s) of the transportation apparatus share information with another user or other users (shared user(s)) of the transportation apparatus instantaneously by displaying one or more information panels at display position(s) on the dashboard screen convenient for the shared users' viewing. This may advantageously let the user(s) of the transportation apparatus configure or set up an information panel for viewing by another user of the transportation apparatus.

Other objects and advantages of the invention will be apparent to those skilled in the art based on the following drawings and detailed description.

BRIEF DESCRIPTION OF THE DRAWINGS

FIG. 4 illustrates one example of information panels displayed on the dashboard screen of the dashboard at a time T+2.

FIG. 5A illustrates that the interchangeable display of information panels on the dashboard screen may be in multiple directions.

FIG. 5B illustrates an information panel may be displayed on top of another information panel in a cluster mode in accordance with the disclosure.

FIG. 8A illustrates one example of information panels displayed on a dashboard screen in accordance with one embodiment of the disclosure.

FIG. 8B illustrates information panels shown in FIG. 8A has been switched on the dashboard screen.

DETAILED DESCRIPTION

Figure 1:
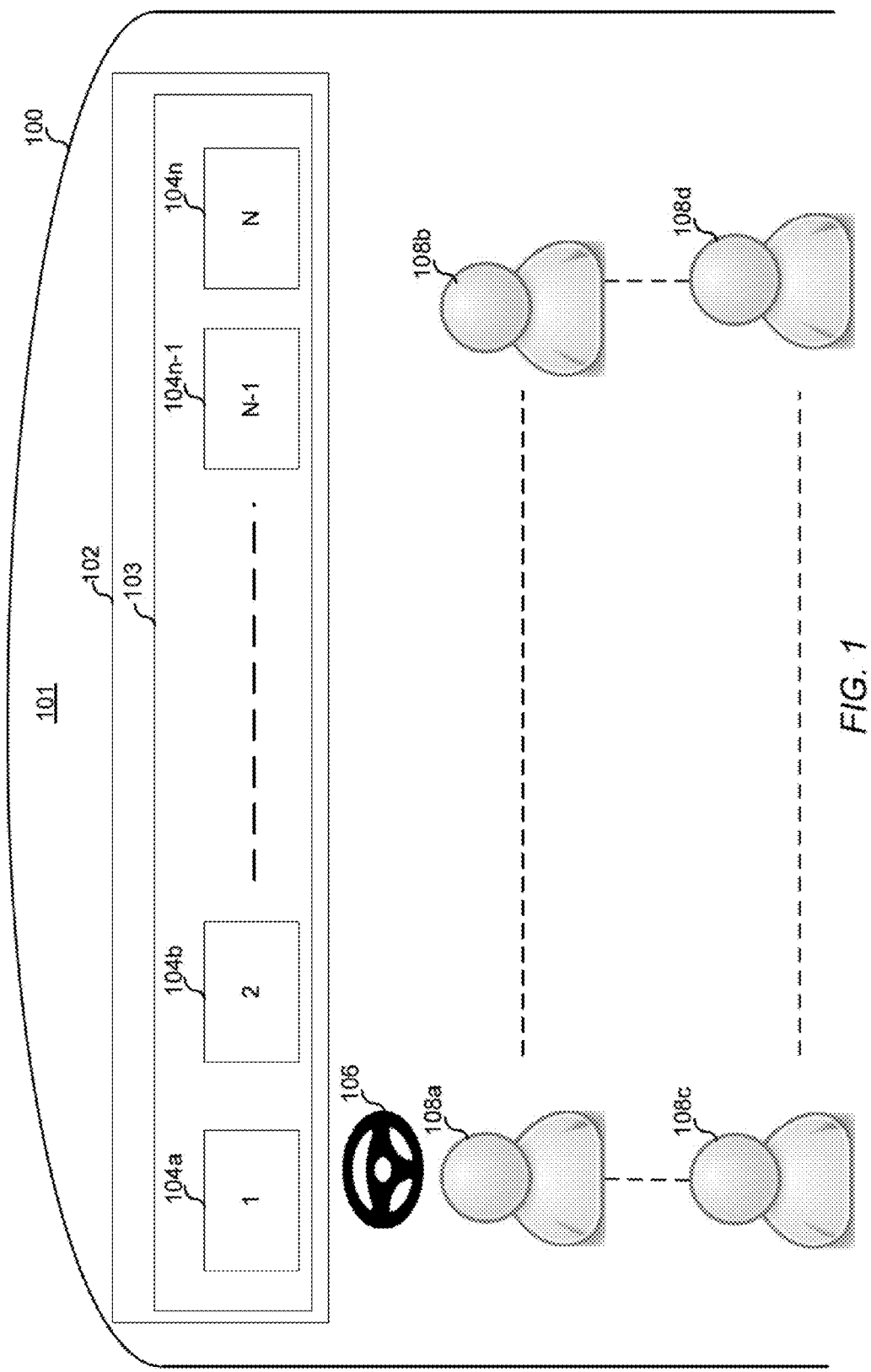
FIG. 1 generally illustrates an embodiment of interchangeable display of information panels on a dashboard screen of a dashboard in a transportation apparatus.

FIG. 1 generally illustrates an embodiment of information panels 104 displayed on a screen 103 of a dashboard 102 in a transportation apparatus 100. The transportation apparatus 100 may include any apparatus that moves in distance. Examples of transportation apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a spaceship, or any other type of aircraft; or may include any other transportation apparatus. In one example, the transportation apparatus 100 is an electrical automobile. As shown, the transportation apparatus 100 may include a cabin 101 with a volume.

As shown in FIG. 1, in the cabin 101, there may be a dashboard 102 that has a screen 103. Although in this example, a dashboard screen 103 occupies the entire surface of the dashboard 102, this is not intended to be limiting. It is contemplated that in some cases, the dashboard screen 103 may occupy a portion of the dashboard 102 instead of the entire dashboard 102. In any case, the dashboard screen 103 is suitable to display one or more information panels, such as the information panels 104 shown in FIG. 1. In implementations, the dashboard screen 103 may include any display technology, such as liquid-crystal display (LCD), crystal LCD, light-emitting diode (LED), organic light-emitting diode (OLED), active-matrix organic light-emitting diode (AMOLED), Plasma, projection panel, cathode ray tube (CRT), and/or any other display technology. As also shown, the information panels 104 displayed on the dashboard screen 103 are separate and independent from each other such that the individual information panels 104 are displayed at corresponding positions on the dashboard screen 103. In this example, information panel 104$a$ is displayed at position 1 on the dashboard screen 103, information panel 104$b$ is displayed at position 2 on the dashboard screen 103, information panel 104$n$-1 is displayed at position N–1 on the dashboard screen 103, and information panel 104$n$ is displayed at position N on the dashboard screen 103.

In some examples, information presented in the information panels 104 may include gauge information related to the transportation apparatus 100, such as current speed/altitude/direction/wind, current longitude/latitude, distance traveled, RPM, fuel level, battery level, and/or any other gauge information related to the transportation apparatus 100. In some examples, information presented in the information panels 104 may include indication information, such as seat belt, airbag, door, trunk, maintenance, safety, window lock, door lock indication information or any other indication information. In some examples, information presented in the information panels 104 may include navigational or GPS information related to navigation of the transportation apparatus 100, such as current street traveled on, map of an area the transportation apparatus 100 is traveling in, the destination information, direction instructions, traffic condition, estimated arrival time, estimated delay due to traffic, and/or any other navigation information. In some examples, information presented in the information panels 104 may include cabin information, such as current temperature, humidity, wind speed, number of passengers in one or more zones in the cabin 101 and/or any other cabin information. In some examples, information presented in the information panels 104 may include configuration information regarding the transportation apparatus 100, such as seat configuration, mirror configuration, battery configuration, driving mode configuration, and/or any other configuration. In some examples, information presented in the information panels 104 may include entertainment information. For example, such an information panel may include a video screen capable of presenting a video or still images, a browser screen capable of presenting web information, a game screen capable of presenting one or more games for user interaction, a music information screen capable of enabling a user to consume music pieces, e-commerce information screen capable of enabling a user to engage remote transaction via the Internet, radio information screen capable of presenting a list of radio stations available for user consumption, and/or any other type of infotainment screen. In some examples, information presented in the information panels 104 may include notification information such as incoming call, incoming text message, incoming video chat request, and/or any other notification information. Other examples of information panels 104 are contemplated.

In accordance with the disclosure, the individual information panels 104 may be displayed on the dashboard screen 103 at corresponding positions as desired by the user(s) 108. In one embodiment, the information panels 104 are displayed at their default positions on the dashboard screen 103. As will be discussed in further detail below, the present disclosure enables the user(s) of the transportation apparatus 100 to instruct the individual information panels 104 to be displayed at new positions on the dashboard screen 103.

As still shown in FIG. 1, the transportation apparatus 100 may comprise one or more steering wheels 106 in the cabin 101. Although only one steering wheel 106 is shown in FIG. 1, this is not intended to be limiting. In some examples, the transportation apparatus 100 may include more than one steering wheel 106. For example, it is contemplated that the transportation apparatus 100 may be an aircraft that comprises at least a main steering wheel 106 for the main pilot and at least a secondary steering wheel 106 for a co-polit.

As also shown in FIG. 1, one or more users 108 may be arranged to occupy their corresponding positions in the cabin 101. The users 108 may include one or more drivers that control the movement or navigation of the transportation apparatus 100, one or more passengers, and/or any other type of users 108. In this example, the user 108$a$ is a driver that controls the driving of the transportation apparatus 100, while other users 108, e.g., users 108$b$-$d$, are passengers. As still shown, there may be multiple rows of users 108 within the cabin 101 of the transportation apparatus 100.

Figure 2:
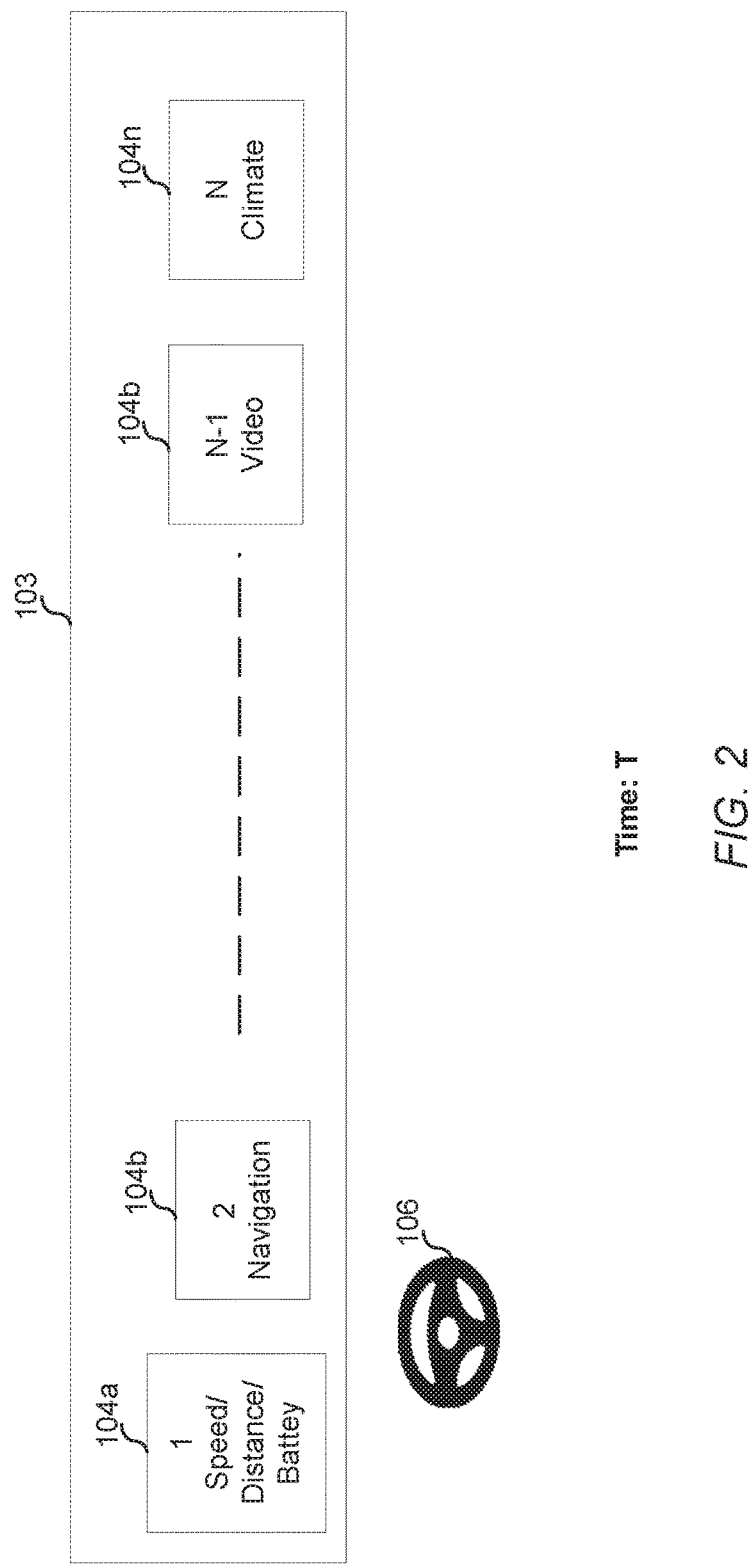
FIG. 2 illustrates one example of information panels displayed on the dashboard screen of the dashboard at a time T.
Figure 3:
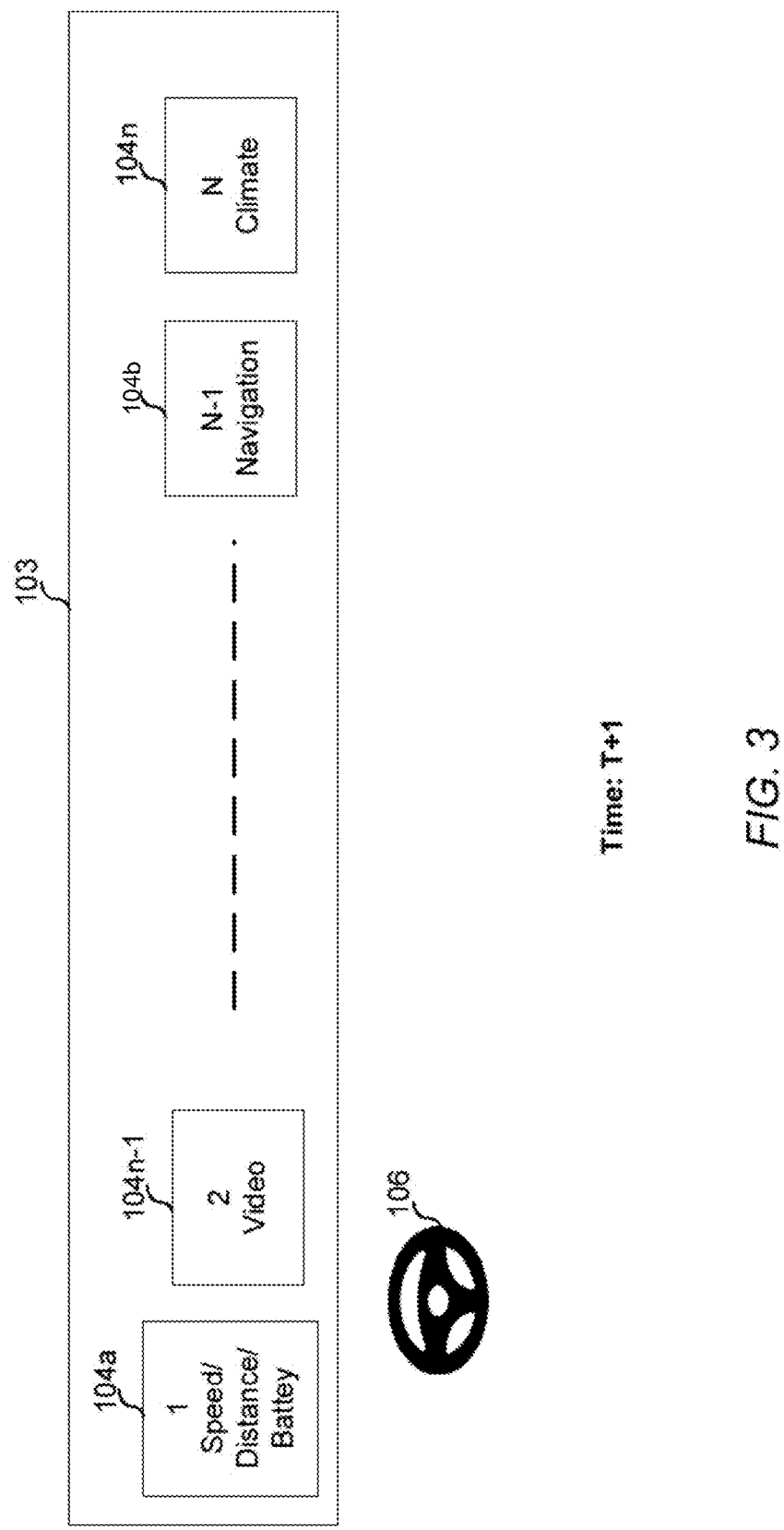
FIG. 3 illustrates one example of information panels displayed on the dashboard screen of the dashboard at a time T+1.

With the arrangement of information panels 104 on the dashboard 102 within the cabin 101 of transportation apparatus 100 having been generally described, attention is now directed to FIGS. 2-4. FIG. 2 illustrates one example of information panels 104 displayed on the dashboard screen 103 as shown in FIG. 1 at a time T. As shown, at time T, the information panel 104$a$ that presents speed, distance, battery and/or any other driving information regarding the transportation apparatus 100 may be displayed at position 1 on the dashboard screen 103. The display of the information panel 104$a$ at position 1 may facilitate the driver(s) to acquire driving information to make appropriate driving decisions, since position 1 is located on the driver's side of dashboard screen 103. As also shown, at time T, the information panel 104$b$ that presents navigation information may be displayed at position 2 on the dashboard screen 103. As described above, the navigation information presented by information panel 104$b$ may include graphical map indicating an area within which the transportation apparatus 100 is currently traveling, and as well as other navigation information such as direction, estimated arrival time, traffic condition, and/or any other navigation information. The display of the information panel 104$b$ at position 2 may facilitate the driver(s) to acquire navigation information to make appropriate driving decisions, since position 2 is located on the driver's side of dashboard screen 103. As still shown, at time T, information panel 104$n$-1 is displayed at position N–1 on the dashboard screen 103. In this example, the information panel 104$n$-1 is a video screen that presents a video to one or more passengers of the transportation apparatus 100. As also shown, at time T, information panel 104$n$ is displayed at position N on the dashboard screen 103. In this example, information panel 104n is a climate control screen capable of enabling a user to control the temperature inside cabin 101 of the transportation apparatus 100.

FIG. 3 illustrates information panels, shown in FIG. 2, are displayed on the dashboard screen 103 at a time T+1. For clarity, FIG. 3 will be described in comparison with FIG. 1. As shown, at time T+1, information panel 104b is displayed at position N−1 on the Dashboard screen 103 and information panel 104n-1 is displayed at position 2 on the dashboard screen 103. The switch of display positions on the dashboard screen 103 may result from a user signal initiated by a user 108 (e.g., a driver or a passenger) of the transportation apparatus 100. For instance, the user 108 may initiate display switch of the two information panels 104 by voice control command, finger gesture, knob switch (i.e., dial), mouse click in an interface on a computer, and/or any other control command that may be initiated by the user 108. In any case, as shown, at time T+1, the video screen presented by the information panel 104n-1 is displayed at driver's side of the dashboard screen 103.

In one scenario, the arrangement of the information panel 104n-1 at driver side may happen when a passenger of the transportation apparatus 100 wants to show the video screen to the driver temporarily. For example, the video presented in video screen may be showing a funny clip that may be of interest to the driver(s). In that case, the passenger(s) may initiate the switch as shown so the video screen may be displayed at position 2 on the dashboard screen 103 in place of the navigation screen presented by the information panel 104b. In another scenario, the arrangement of the information panel 104b at passenger side may happen when a driver of the transportation apparatus 100 wants a passenger to enter destination information while the driver is driving the transportation apparatus 100. In that case, the driver may initiate the switch as shown so the navigation screen may be displayed at position 3 on the dashboard screen 103 in place of the video screen such that the passenger can enter the new destination information for the driver.

FIG. 4 illustrates information panels 104, shown in FIG. 2, are displayed on the dashboard screen 103 of the dashboard 102 at a time T+2. In FIG. 4, at time T+2, the screen 104a is duplicated at position N, replacing the display of the climate control screen 104n. In one scenario, the arrangement of the information panel 104a may happen when a driver of the transportation apparatus 100 wants the passenger to acquire driving information of the transportation apparatus 100. This may be helpful when one or more passengers are co-drivers or coaches of the main driver. In that case, the duplicate of the information panel 104a as shown in FIG. 4 may be initiated either by the main driver or the co-driver(s).

It should be appreciated that the interchangeable display of information panels 104 on the dashboard screen 103 in accordance with the present disclosure may take place in multiple directions, not necessarily limited to the horizontal and/or vertical directions. This is illustrated in FIG. 5B. As shown in FIG. 5B, a given information panel 104x displayed at position X at a given time may be switched to be displayed at other positions on the dashboard screen 103 in all directions.

In some examples, an information panel 104 may displayed on top of another information panel in a cluster mode. This is illustrated in FIG. 5B. As shown, the display position of information panel 104x on the dashboard screen 103 may be switched from position X to position N such that the information panel 104x is displayed on top of the information panel 104n.

In some examples, the switched information panels may switched back to their display positions prior to the switch after a predetermined period. For example, referring back to FIG. 3, the switched display of the information panels 104n-1 and 104b may be switched back to their positions shown in FIG. 2 after, for example, five seconds. As another illustration, referring to FIG. 4, the duplicate display of information panels 104a at position N may be switched back to the display arrangement in FIG. 2 after thirty seconds.

Figure 6:
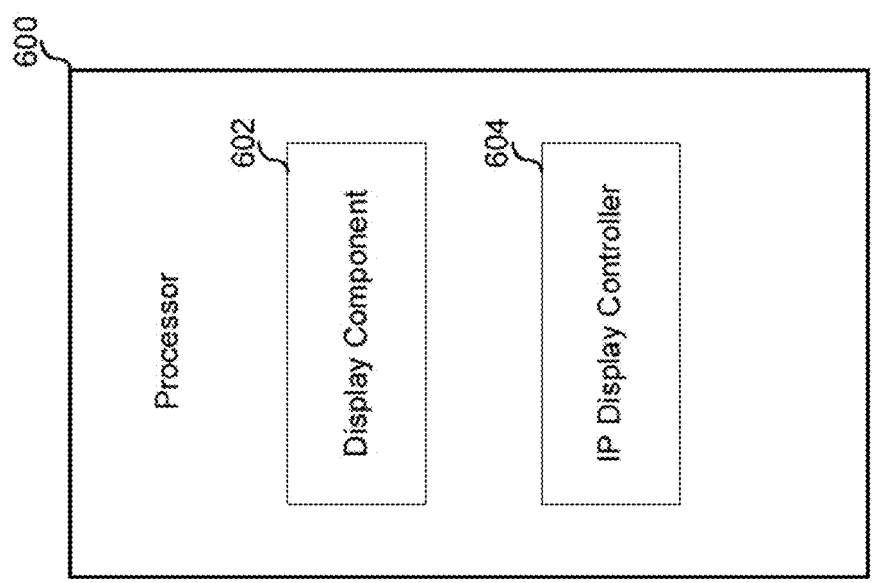
FIG. 6 generally illustrates a block diagram of a processor configured to effectuate the interchangeable display of information panels in accordance with one embodiment of the disclosure.
Figure 7:
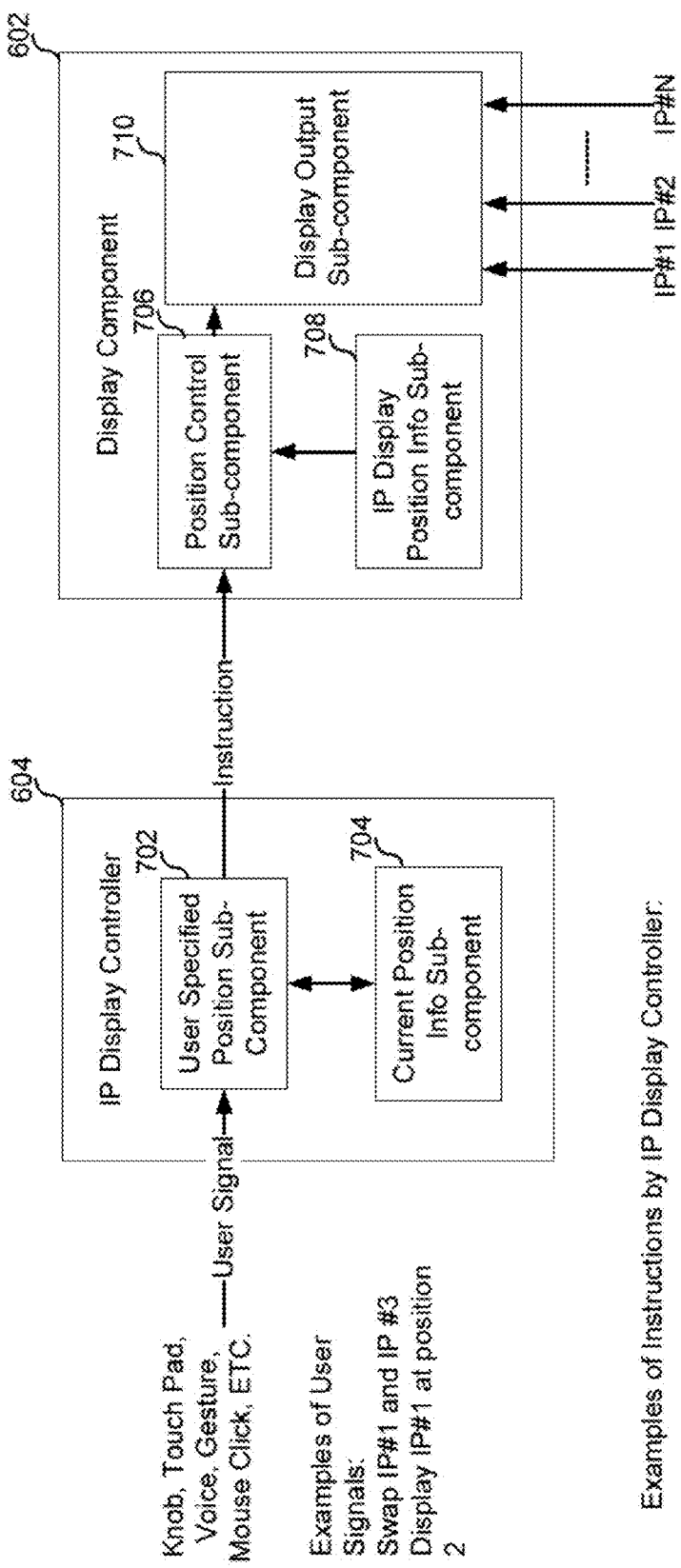
FIG. 7 illustrates one example of the components shown in FIG. 6.

With the interchangeable display of information panels 104 on the dashboard screen 103 of the dashboard 102 in a transportation apparatus 100 having been generally described, attention is now directed to FIGS. 6-7, where exemplary implementations of the present disclosure is described. FIG. 6 generally illustrates a block diagram of a processor configured to effectuate the interchangeable display of information panels in accordance with one embodiment of the disclosure. As shown, a processor 600 may be included in the transportation apparatus 100. In some examples, the processor 600 is an electronic control unit of the transportation apparatus 100. As shown, in some example, as in this example, the processor 602 comprises a display component 600, an information panel display controller 604, and any other components (if any). The display component 602 may be configured to effectuate the display of information panels on the Dashboard screen 103 of the dashboard 102 in the transportation apparatus 100 as shown in FIG. 1. In implementations, the display component 602 may be configured to receive positions on the dashboard screen 103 requested by the user(s) of the transportation apparatus 100 for displaying corresponding information panels and to effectuate the display of the information panels at these positions on the dashboard screen 103 and/or perform any other operations. The information panel display controller 604 may be configured to receive user signals indicating positions for displaying information panels, to obtain current display positions of the requested information panels, generating instructions instructing the display component 602 to display the requested information panels at requested positions, and/or perform any other operations.

FIG. 7 illustrates one example of the components shown in FIG. 6. It will be described with reference to FIG. 1 and FIG. 6. As shown, the IP display controller 604, in this example, comprises a user specified position sub-component 702, a current position information sub-component 704, and any other components (if any). The user specified position sub-component 702 may be configured to receive user signals. The received user signals may indicate a request to switch display of information panels on the dashboard screen 103. As shown, the user signals may be received from various sources, such as a knob (e.g., dial) on the dashboard 102, a touch pad on a console, a smartphone, a tablet associated with the user(s) of the transportation apparatus 100, finger gestures on the dashboard screen 103, hand gesture captured by a camera in the transportation apparatus 100, voice control command, mouse click on an interface presented on a computer (e.g., a laptop) associated with the user(s) of the transportation apparatus 100, and/or any other source. The content of the received user signals may vary. Some examples of the user signals may include "swap information panel #1 and information panel #3", "Display information panel #1 at position 2 (in place of whatever information panel currently displayed at position 2)", and any other user signals.

After receiving the user signals, the user specified position sub-component 702 may request the current position information sub-component 704 to obtain current display position of the information panels requested. For example, in the case of the received user signal being "swap information panel #1 and information panel #3", the current position information sub-component 704 may be instructed to obtain the respective current display positions of information panel #1 and information panel #3 on the Dashboard screen 103.

After receiving the current display positions of the requested information panels, the user specified position sub-component 702 may be configured to generate instructions to instruct the display component 602 to switch the display of the requested information panels. Still using the example above, the current position information sub-component 704 may obtain the current display position of information panel #1 at position #1 and the current display position of information panel #3 at position #5; and the user specified position sub-component 702 may generate an instruction of "switch (position) 3 and 5". In another example, if the received user signal indicate a request to duplicate an information panel (e.g. displayed at a current position 2) to another position (e.g., position 1), the user specified position sub-component 702 may generate an instruction "duplicate 2 to 1". Still as another example, if the received user signal indicates a request to move the information panel displayed at position N−1 to position 2, the user specified position sub-component 702 may generate an instruction "switch 2 and N−1; and turn off N−1". As shown, the instructions generated by the user specified position sub-component 702 may be sent to the display component 602.

The display component 602, in this example, comprises a position control sub-component 706, an IP display position information sub-component 708, a display output sub-component 710, and any other components (if any). The position control sub-component 706 may be configured to receive the instructions from the IP display controller 604. After receiving the instructions, the position control sub-component 706 may instruct the IP display position information sub-component 708 to obtain current information panels displayed at the positions included in the instructions. For example, in the case of the received instructions being "switch 1 and N", the IP display position information sub-component 708 may be instructed to obtain current information panels being displayed at position 1 and position N—for example information panel #2 being displayed at position 1 and information panel #4 being displayed at position 4. After obtaining the information panel(s) being displayed at the display position(s) included in the instruction via the IP display position information sub-component 708, the position control sub-component 706 may be configured to generate a position control command to instruct the display output sub-component 710 to display the information panels accordingly. For example, in the example above, the position control sub-component 706 may generate a position control command "Display IP#2 at position 4; Display IP #4 at position 1". The display output sub-component 710 may be configured to output display of the information panels according to the instructions from the position control sub-component 706. As shown, the display output sub-component 710 may receive display information for displaying the information panels and receive the position control command from the position control sub-component 710. Based on these inputs, the display output sub-component 710 may display the information panels at the positions as instructed by the position control command from the position control sub-component 706.

FIGS. 8A-B illustrate one example of interchangeable display of information panels on a Dashboard screen 103 in a transportation apparatus 100 in accordance with the disclosure. They will be described with reference to FIG. 1. As shown in FIG. 8A, information panels 802 are displayed at their respective positions on the Dashboard screen 103. In this example, the information panel 802a presents cabin and driver related information and is displayed on the left side of the dashboard screen 103; the information panel 802b presents driving related information and is displayed at the center of the dashboard screen 103; and the information panel 802c presents infotainment and is displayed at the right side of the dashboard screen 103. As shown in FIG. 8B, the information panels shown in FIG. 8A may be switched in accordance with the disclosure. In this example, the display of information panel 802b is switched with the display of the information panel 802a.

Figure 9:
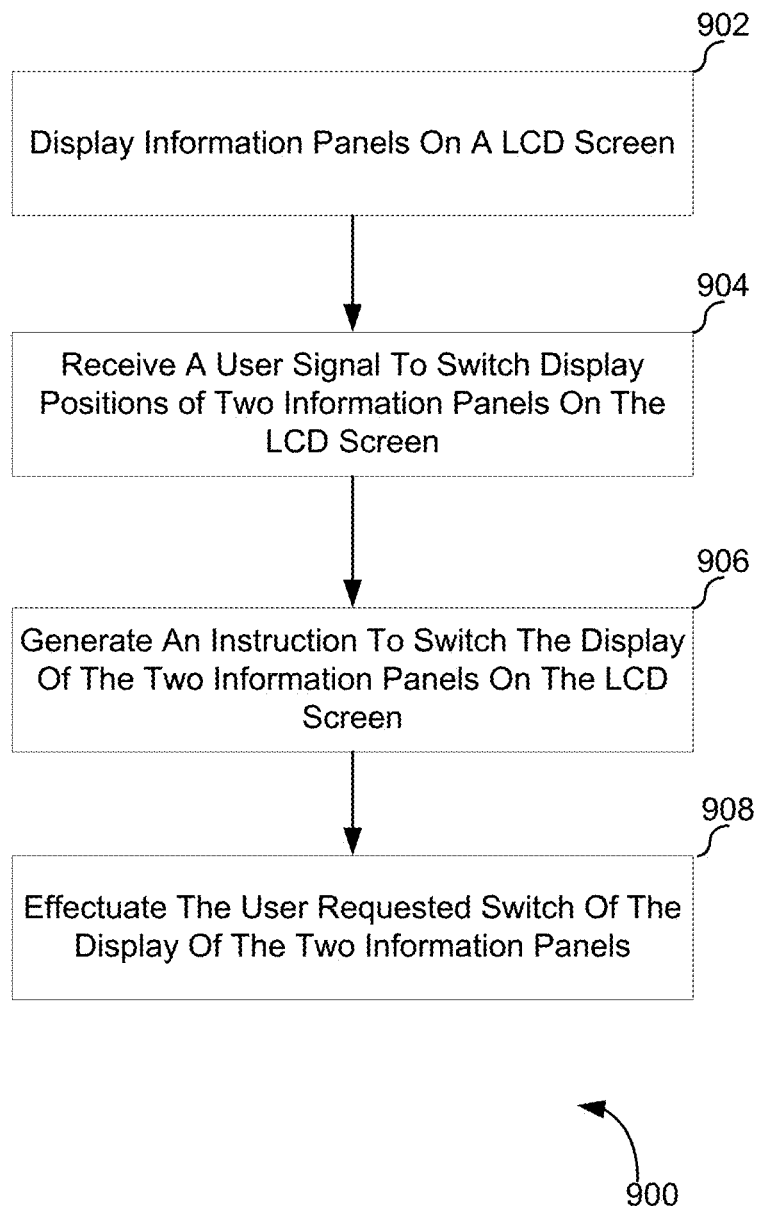
FIG. 9 illustrates one exemplary method for effectuating interchangeable display of information panels on a Dashboard screen in a transportation apparatus.

FIG. 9 illustrates one exemplary method for effectuating interchangeable display of information panels on a dashboard screen in a transportation apparatus. The operations of method 900 presented below are intended to be illustrative. In some embodiments, method 900 may be accomplished with one or more additional operations not described and/or without one or more of the operations discussed. Additionally, the order in which the operations of method 900 are illustrated in FIG. 9 and described below is not intended to be limiting.

In some embodiments, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 902, multiple information panels may be displayed on a Dashboard screen on a dashboard in a transportation apparatus 100. As described above, the information panels displayed at operation 902 may be separate and independent from each other. For example, at operation 902, a first information panel may be displayed at position 1 on the dashboard screen, and a second information panel may be displayed at position 2 on the dashboard screen.

At an operation 904, a user signal may be received. The received user signal may indicate a request to switch display of the information panels. For example, the received user signal may indicate a request to switch the display position of the first and second information panels on the dashboard screen. As described above, the source of the user signal may vary. Example of such a source may include a knob (e.g., dial) on the dashboard, a touch pad on a console, a smartphone, a tablet associated with the user(s) of the transportation apparatus, finger gestures on the dashboard screen, hand gesture captured by a camera in the transportation apparatus, voice control command, mouse click on an interface presented on a computer (e.g., a laptop) associated with the user(s) of the transportation apparatus, and/or any other source.

At an operation 906, an instruction to switch the display of two information panels may be generated in accordance with the user signal received at operation 904. For example, an instruction may be generated to switch the display positions of first and second information panels on the Dashboard screen. In some examples, operation 906 may be performed by a IP display controller substantially similar to or the same as the IP display controller 604 illustrated and described herein.

At an operation 908, the user requested switch of the display of the information panels may be effectuated. In some examples, operation 908 may be performed by a display component substantially similar to or the same as the display component 602 illustrated and described herein.

Implementations of the invention may be made in hardware, firmware, software, or various combinations thereof. The invention may also be implemented as instructions stored on a machine-readable medium, which may be read and executed using one or more processing devices. In one implementation, machine-readable media may include various mechanisms for storing and/or transmitting information in a form that can be read by a machine (e.g., a computing device). For example, machine-readable storage media may include read-only memory, random access memory, magnetic disk storage media, optical storage media, flash memory devices, and other media for storing information, and machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. An information display system in a transportation apparatus, the information display system comprising:
   a liquid crystal display (LCD) screen that occupies at least a portion of a dashboard of the transportation apparatus, wherein the LCD screen is capable of graphically displaying multiple information panels at respective positions on the LCD screen, wherein the information panels include a first information panel and a second information panel; and
   a processor configured to:
      display the first information panel at a first position on the LCD screen and display the second information panel at a second position on the LCD screen, wherein the first display position corresponds to a driver of the transportation apparatus and the second display position correspond to a passenger of the transportation apparatus;
      receive a user signal indicating a request to switch the display positions of the first and second information panels on the LCD screen;
      generate a switch instruction to switch the display of first and second information panels in accordance with the received user signal;
      display the first information panel at the second position on the LCD screen and display the second information panel at the first position on the LCD screen in accordance with the generated switch instruction;
      generate a switch-back instruction to switch back the display positions of the first information panel and second information panel to their previous display positions prior to the switching after a predetermined time period.

2. The information display system of claim 1, wherein the processor is further configured to receive a user signal indicating a request to move the display position of the first information panel to a third position on the LCD screen.

3. The information display system of claim 2, wherein a third information panel is also displayed at the third position such that the first and third information panels are displayed in a cluster mode after the display of the first information panel is moved to the third display position.

4. The information display system of claim 1, wherein the processor is further configured to receive a user signal indicating a request to duplicate the display of the first information panel at a third display position on the LCD screen.

5. The information display system of claim 1, wherein the first position is horizontal to the second position on the LCD screen.

6. The information display system of claim 1, wherein the first position is vertical to the second position on the LCD screen.

7. The information display system of claim 1, wherein the first position is diagonal to the second position on the LCD screen.

8. The information display system of claim 1, wherein the transportation apparatus is a vehicle, a vessel or an aircraft.

9. A method of displaying information panels in a transportation apparatus, the transportation apparatus comprising a liquid crystal display (LCD) screen that occupies at least a portion of a dashboard of the transportation apparatus, wherein the LCD screen is capable of graphically displaying multiple information panels at respective positions on the LCD screen, wherein the information panels include a first information panel and a second information panel, the method comprising:
   displaying the first information panel at a first position on the LCD screen and display the second information panel at a second position on the LCD screen, wherein the first display position corresponds to a driver of the transportation apparatus and the second display position correspond to a passenger of the transportation apparatus;
   receiving a user signal indicating a request to switch the display positions of the first and second information panels on the LCD screen;
   generating a switch instruction to switch the display of first and second information panels in accordance with the received user signal;
   displaying the first information panel at the second position on the LCD screen and display the second information panel at the first position on the LCD screen in accordance with the generated switch instruction;

generating a switch-back instruction to switch back the display positions of the first information panel and second information panel to their previous display positions prior to the switching after a predetermined time period.

10. The method of claim 9, further comprising receiving a user signal indicating a request to move the display position of the first information panel to a third position on the LCD screen.

11. The method of claim 10, wherein a third information panel is also displayed at the third position such that the first and third information panels are displayed in a cluster mode after the display of the first information panel is moved to the third display position.

12. The method of claim 9, further comprising receiving a user signal indicating a request to duplicate the display of the first information panel at a third display position on the LCD screen.

13. The method of claim 9, wherein the first position is horizontal to the second position on the LCD screen.

14. The method of claim 9, wherein the first position is vertical to the second position on the LCD screen.

15. The method of claim 9, wherein the first position is diagonal to the second position on the LCD screen.

16. The method of claim 9, wherein the transportation apparatus is a vehicle, a vessel or an aircraft.

* * * * *

UNITED STATES PATENT AND TRADEMARK OFFICE
CERTIFICATE OF CORRECTION

PATENT NO. : 10,198,145 B2  
APPLICATION NO. : 15/359173  
DATED : February 5, 2019  
INVENTOR(S) : Yong-Syuan Chen et al.

Page 1 of 1

It is certified that error appears in the above-identified patent and that said Letters Patent is hereby corrected as shown below:

On the Title Page

Item (73) should be corrected to read:
THUNDER POWER NEW ENERGY VEHICLE DEVELOPMENT COMPANY LIMITED, Central (HK)

Signed and Sealed this
Sixteenth Day of April, 2019

Andrei Iancu
*Director of the United States Patent and Trademark Office*